March 10, 1970  C. H. PORTER  3,499,642
SINE TABLES

Filed Nov. 10, 1966  4 Sheets-Sheet 1

INVENTOR:
Charles Hackwood Porter
by Harry Ernest Rubens
atty

March 10, 1970     C. H. PORTER     3,499,642

SINE TABLES

Filed Nov. 10, 1966     4 Sheets-Sheet 2

INVENTOR:
Charles Hackwood Porter
by Harry Ernest Rubens
atty

March 10, 1970　　　C. H. PORTER　　　3,499,642
SINE TABLES

Filed Nov. 10, 1966　　　　　　　4 Sheets-Sheet 3

INVENTOR:
Charles Hackwood Porter
by Harry Ernest Rubens
atty

March 10, 1970　　C. H. PORTER　　3,499,642
SINE TABLES

Filed Nov. 10, 1966　　4 Sheets-Sheet 4

INVENTOR:
Charles Hackwood Porter
by Harry Ernest Rubens
atty

United States Patent Office 3,499,642
Patented Mar. 10, 1970

3,499,642
SINE TABLES
Charles Hackwood Porter, Birmingham, England, assignor to Harolds Gauges Limited, Birmingham, England, a British company
Filed Nov. 10, 1966, Ser. No. 593,530
Int. Cl. B23q 1/04
U.S. Cl. 269—71
4 Claims

ABSTRACT OF THE DISCLOSURE

A sine table characterized by a work-supporting platform, a base, bearings mounted on the base, wherein the work supporting platform can be raised relative to the base and freely pivot about the roller at one end of the base.

---

This invention relates to sine tables of the kind for use in supporting workpieces. Sine tables of this kind can be used during workpiece machining, inspecting, or other processes.

In accordance with the invention a sine table of the kind referred to comprises a workpiece-supporting platform fixed to and carried by means comprising a first pair of spaced parallel rollers arranged for mounting in corresponding bearings, the rollers being formed with shoulders for abutment against corresponding sides of the bearings.

Either one of the rollers may be mounted in corresponding bearings in a base plate or base plates with the other roller free of bearings for contact with any supporting surface or a spacing block or blocks.

Alternatively either one of the rollers may be mounted in bearings in a base plate with the other roller either also mounted in bearings in the base plate or spaced from said bearings by contact with a spacing block or blocks resting on the base plate.

Typical examples of the invention will now be more particularly described with reference to the accompanying drawings wherein.

Figure 1:
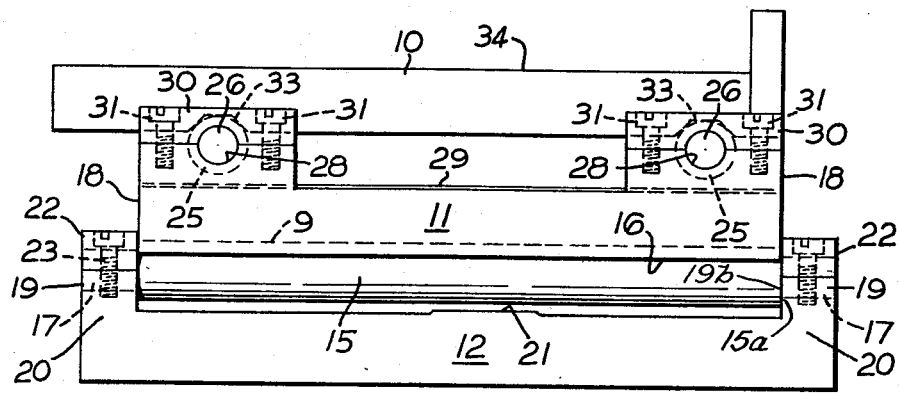
FIGURE 1 is an elevation of a first example of a sine table.
Figure 2:
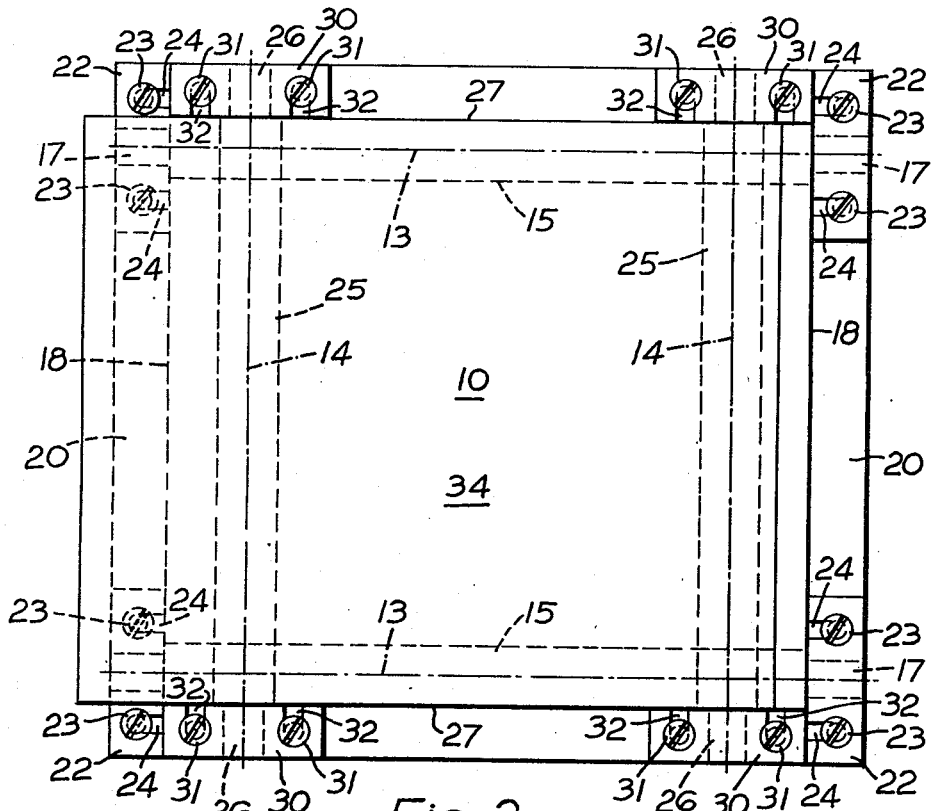
FIGURE 2 is a plan of the sine table shown in FIGURE 1.
Figure 3:
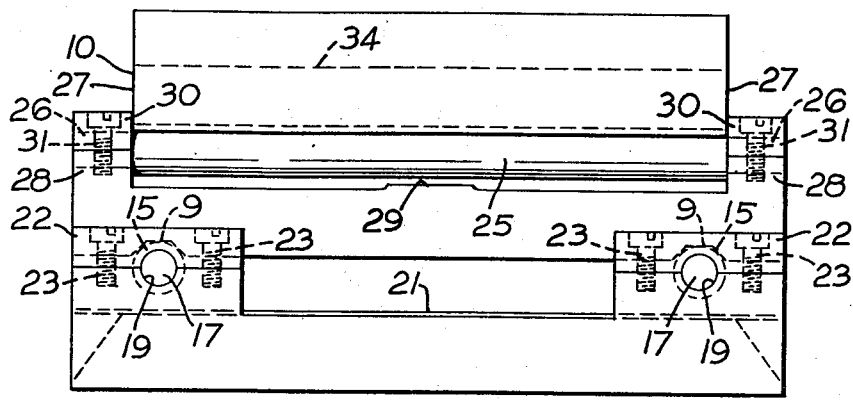
FIGURE 3 is a further elevation of the sine table shown in FIGURE 1.

Referring initially to FIGURES 1–3, the sine table shown therein comprises three members, namely a first member or platform 10 for supporting a workpiece, a second member or base 12, and an intermediate plate or third member 11. The base supports the intermediate plate and the latter supports the platform. All three members are rectangular. The sine table is of the compound form with the intermediate plate 11 pivoted to the base plate 12 so as to be able to turn about either one of two horizontal axes 13, and the platform 10 pivoted to the intermediate plate 11 so as to pivot about either one of two axes 14 perpendicular to the axes 13.

The intermediate plate 11 is provided with a first pair of spaced parallel rollers 15 fixed thereto in truncated V-shaped grooves 9 and extending beyond and along its underside 16. The ends of the rollers 15 are constituted by spigots 17 projecting beyond the sides 18 of the intermediate plate 11 and received in bearings 19 formed on the upper edges of side walls 20 projecting upwardly from the base plate 12. The bearings 19 provide for an accurate spacing of usually $\frac{1}{10}''$ between the rollers 15 and the upper surface 21 of the base plate 12. The bearings 19 are each formed in two halves of which the top half 22 can be easily removed by the loosening of screws 23 in slots 24 in the halves 22. Thus the top halves 22 of the bearings 19 for one of the rollers 15 can be removed to allow the intermediate plate 11 to pivot about the other of the rollers 15. The angle in which the intermediate plate 11 is held with respect to the base plate 12 is determined by the size of a spacing block or blocks inserted between said one roller and the base plate 12 intermediate its side walls 20, the roller contacting the block or blocks, and the latter resting on the upper surface 21 of the base plate 12.

The platform 10 is similarly pivoted to the intermediate plate 11 through a pair of spaced parallel rollers 25 having spigots 26 constituting their ends and projecting beyond the sides 27 of the platform 10 and received in bearings 28 standing upwardly from the intermediate plate 11. The rollers 25 are mounted in truncated V-shaped grooves 33. The bearings 28 space the rollers 25 an accurate $\frac{1}{10}$ of an inch above the upper surface 29 of the intermediate plate 11. As before, the top halves 30 of the bearings 28 can be removed by the loosening of screws 31 in slots 32 in the halves 30. Thus, with removal of said top halves 30 of the bearings 28 of one of the rollers 25, the platform 10 can be pivoted about the other roller and the angle assumed by the platform 10 with relation to the intermediate plate 11 is determined by the size of a spacing block inserted between said one roller and the upper surface 29 of the intermediate plate 11, the roller contacting the block or blocks, and the latter resting on the upper surface 29 of the plate 11.

By a suitable choice of the size of the spacing blocks, or sizes of combinations of spacing blocks, the angles assumed by the platform 10 and the intermediate plate 11 in relation to the intermediate plate 11 and the base plate 12 respectively can easily be adjusted to give the required compound angle to the upper surface 34 of the platform 10. The platform 10 is used, as mentioned above, for supporting workpieces and this may be beneath a drill or in a facing or planing machine, for example, in order to achieve the required angle of the part of the workpiece to be machined with relation to the surface upon which the sine table is mounted. One particular application of such a sine table is its use for supporting turbine blades during machine operations thereto.

It will be appreciated that the rollers 15 and 25 are formed with shoulders 15a between the main bodies of the rollers and the spigots 17 and 26 respectively. These shoulders are located so as to abut the corresponding sides 19b of the bearings 19 and 28 respectively and hence minimise or even prevent longitudinal movement of the rollers 15 and 26 in their bearings 19 and 28. This ensures that the platform 10 is as stable as possible for supporting the workpieces.

Figure 4:
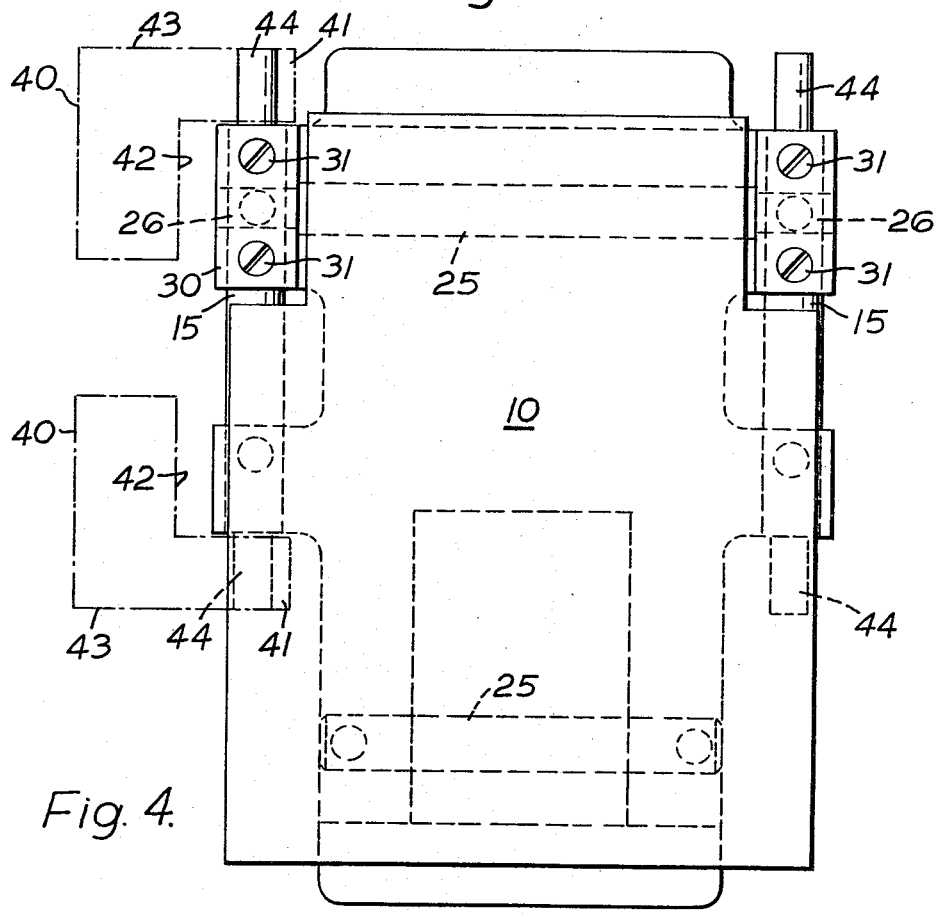
FIGURE 4 is a plan of a modified sine table.
Figure 5:
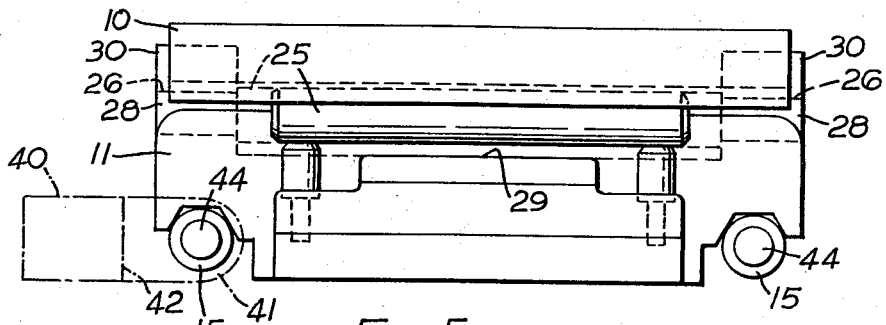
FIGURE 5 is an end view of the sine table shown in FIGURE 4.

Referring now to FIGURES 4 and 5, the base plate 12 is replaced, for the purpose of decreasing the total height of the sine table as much as possible, by two base strips 40 shown in dashed lines. Each base strip 40 is of generally rectangular form having a bearing 41 projecting from one 42 of its longer sides adjacent one end 43 for receiving one of the spigoted ends 44 of either of the rollers 15 fixed to the intermediate plate 11. In this instance the roller provided with the base strips 40 is only spaced by the bearings 41 above a supporting surface for the sine table by the accurate amount of $\frac{1}{10}$ of an inch, and the intermediate plate 11 is angled as required by the insertion of spacing blocks between the roller free of base strips 40 and the supporting surface. Thus the thickness of the previously described base plate 12 is removed from the total height of the sine table although the sine table is capable of the extent of operation of the one described with reference to FIGURES 1–3. If required the sine table may be used without the base strips, and with the rollers 15 contacting the supporting surface directly, for example during inspection of workpieces.

When the base strips 40 are used, they are particularly suitable for use with magnetic supporting surfaces, or they may be clamped to the supporting surface as the base plate 12 can be clamped.

Figure 6:
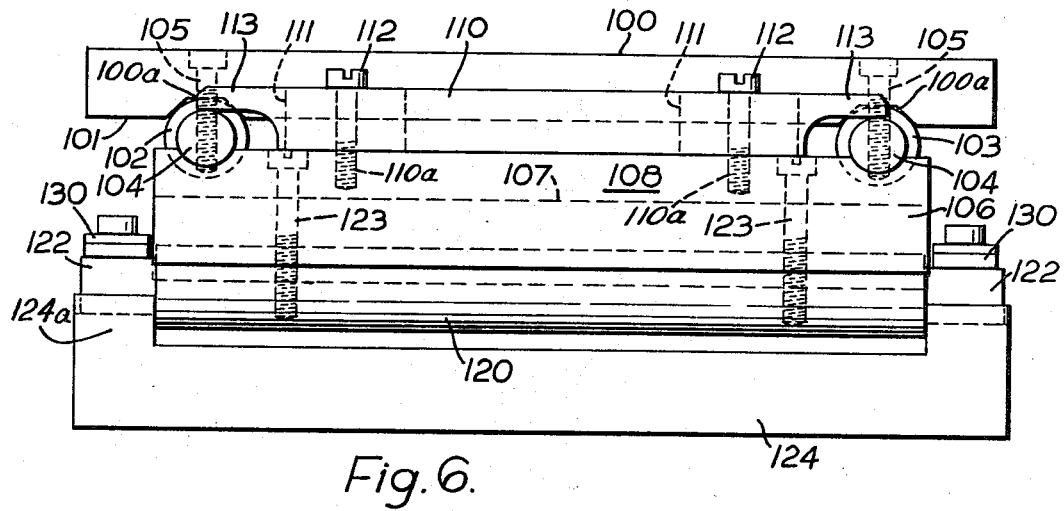
FIGURE 6 is an elevation of a further modification.
Figure 7:
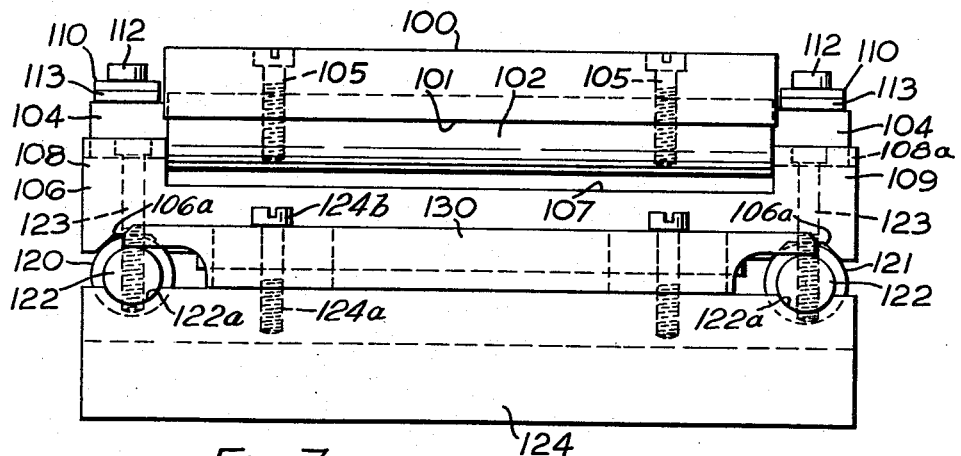
FIGURE 7 is an end elevation of the same.
Figure 8:
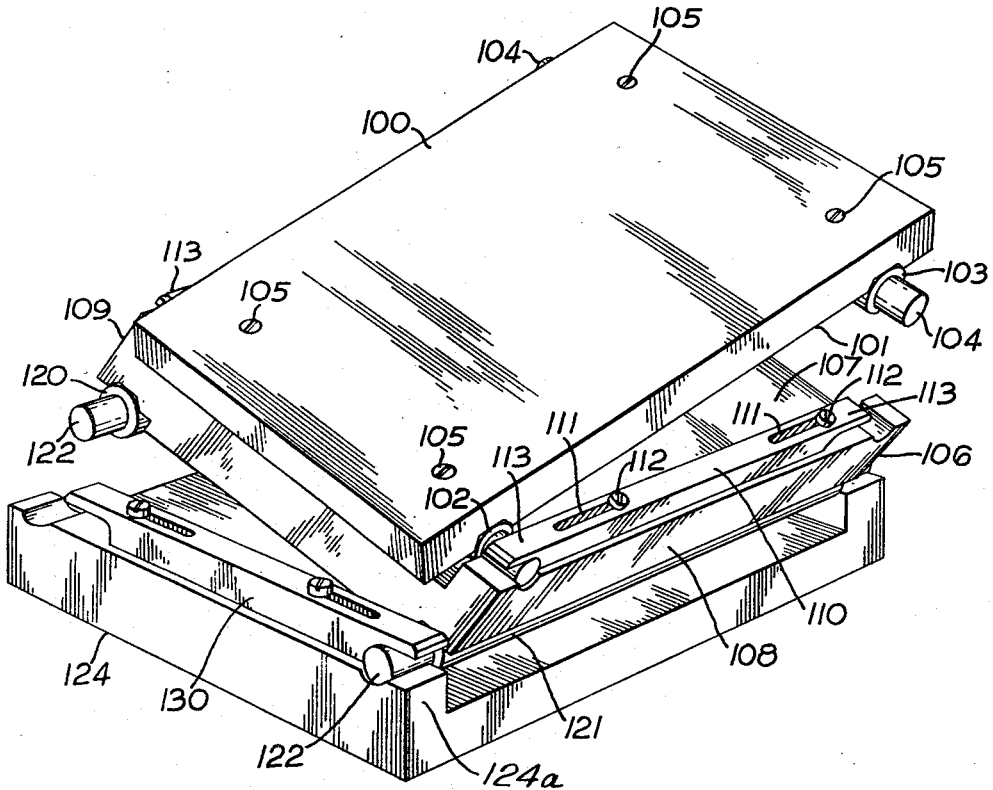
FIGURE 8 is a perspective view of the further modification.

Referring now to FIGURES 6–8, the further modified sine table is substantially rectangular and is provided with a plain flat top surface 100 upon which the workpiece may be mounted. On its parallel lower surface 101 it is provided with a pair of shallow channels 100a each of which accommodates and locates one of a pair of parallel rollers 102, 103 which have end portions or trunnions 104 which are co-axial to the rollers and project outward beyond the edges of the table at opposite sides thereof. The rollers are held in place by bolts or screws 105 engaged through the table top in transverse tapped bores of the rollers.

The centre part 106 is provided with a generally flat central area 107 extending between a pair of parallel shoulders 108, 109 which are upstanding from the plate and each of the shoulders has a transverse shallow recess 108a in each end and the recesses in one shoulder 109 are co-axially aligned with those in the other shoulder. The table is located on the centre plate with the trunnions 104 of the rollers seated in the recesses in the said shoulders 108, 109. For these purposes the centre part has a dimension between the shoulders which accommodates the width of the table measured along the axis of the rollers and hence the centre part is wider than the top plate by the thickness of the two shoulders. It will be appreciated that the rollers do not themselves contact the centre part between the shoulders.

Each of the said shoulders of the centre plate is provided between the two recesses therein with a pair of tapped holes 110a and the said shoulder slidably accommodates a latch bar 110 which is provided with a pair of elongated slots 111, and screws 112 pass through the slots into the tapped holes in the shoulders so as to allow the latch bars to slide along the shoulders. Each latch bar has a nose 113 shaped so that when the latch bar is slid in one direction the leading nose may engage over the trunnion which is seated in the recess at that end, and when so engaged the opposite end of the latch bar is taken clear of the other trunnion engaged in the recess in the opposite end of that shoulder. Hence when both latch bars on the centre part are slid in the same direction the one roller (via its trunnions) is rendered captive in the recesses on the centre part but is free to rotate in the space between said recess and said nose (which cooperate to journal the trunnions), whilst the other roller may be lifted clear of the shoulders beyond the latch bars when the table is hinged and swung about the captive roller. By returning the latch bars to the opposite extreme position when the table is thus inclined the table is freed for release from the centre part.

Alternatively by returning the table and then retracting the latch bars to the opposite extreme position the table is free to pivot about the other and now captive roller.

The centre part 106 has on its lower surface a pair of shallow parallel recesses 106a one of which extends below one of the shoulders and the other of which is parallel to the other of the shoulders. Each of these recesses accommodates a further roller 120, 121 and again the rollers are of sufficient length so that their co-axial trunnion portions 122 extend beyond the lateral edges of the centre part and similarly each of these rollers is secured in place to the centre part by a pair of screws 123 passed through holes in the centre part and engaging tapped bores in the rollers.

The base 124 comprises a central substantially flat area bounded upon two parallel sides by upwardly projecting and parallel shoulders 124a similar to those of the centre part and each of which has recesses 122a to accommodate the ends of the rollers which are attached to the centre part and also holes 124a for the screws 124b for a further pair of latch bars 130. Again it will be appreciated that the length of the centre part measured along the rollers which are attached thereto by the screws is equal to the clearance between the two shoulders of the base. The rollers attached to the centre part are at right angles to those attached to the table.

Hence by actuating the latch bars of either the base or the centre part or both, individual slip gauges or the like can be located between the base and the centre part and/or the centre part and table so as to incline the top of the base plate in two mutually perpendicular planes (as shown for example in FIGURE 8) and within a range of limits determined largely by the proximity of the rollers to the edges of the parts to which they are secured.

The sine table provided by the present invention can rapidly be changed from one end to the other, so that instead of the workpiece being inclined at for example 30° to the horizontal in one direction it can be inclined at a similar or different angle in the opposite direction. Further there are no separate parts which need to be detached from the unit and may become lost when angular changes are made, and the complete table can be rendered most compact, since the overall dimensions of the table as a whole may be no more than those of the table top plus the width of the latch bars. It will also be appreciated that other forms of latch bars may be used, e.g. swivelling ones.

I claim:

1. A sine table comprising a work-supporting platform, a base, a pair of rollers, and two pairs of bearings mounted on said base, each of said rollers having a reduced diameter portion at each end and a shoulder between each said portion and the larger diameter portion of said roller, said reduced diameter portions each being located in a corresponding one of said bearings with the shoulder abutting said bearing, said rollers having their longitudinal axes parallel and being disposed between the base and platform, said platform being secured to said rollers and the said rollers merely resting on said bearings, said platform being free to pivot to an angle with respect to the base about either one of the rollers.

2. A sine table as claimed in claim 1 provided with a second pair of rollers, two further pairs of bearings, and a third member additional to the base and platform spaced above said base with the second pair of rollers interposed both pairs of rollers being substantially identical and mounted upon their respective bearings, one pair of bearings being secured to the base as aforesaid and the other pair of bearings being secured to the third member, and the two pairs of rollers being mutually mounted at right angles, one pair to the other, said platform being free to pivot to a compound angle about one of the rollers of each pair.

3. A sine table as claimed in claim 1, wherein at least one latch bar is provided, said latch bar being mounted on said base and means being provided permitting sliding of the latch bar along the base, said latch bar being of a length equal to the spacing between the reduced diameter portions of the two rollers plus the said reduced diameter of one roller, and said means permitting sliding being arranged so that either end of the latch bar may overlie the adjacent reduced diameter portion of one roller when the opposite end of the latch bar is clear of the reduced diameter portion of the other roller, and said latch bar is capable of sliding to clear the said portion of said one roller and overlie the said portion of the said other roller.

4. A sine table as claimed in claim 2, wherein the base and the third member are each provided with at least one latch bar, one said latch bar being mounted on said base and the other on said third member, and means being provided permitting sliding of one latch bar along the base, and the other latch bar along the third member, each said latch bar being of a length equal to the spacing between the reduced diameter portions of the corresponding two rollers plus the said reduced diameter of one roller, and said means permitting sliding being arranged so that either end of each latch bar may overlie the adjacent reduced diameter portion of a corresponding one roller when the opposite end of the latch bar is clear of the reduced diameter portion of the other roller, and each said latch bar being capable of sliding to clear said portion of said corresponding one roller and overlie the said portion of the said other corresponding roller.

References Cited

UNITED STATES PATENTS

| | | |
|---|---|---|
| 2,351,773 | 6/1944 | Lovenston. |
| 2,816,489 | 12/1957 | Robbins _____ 269—309 |
| 3,069,154 | 12/1962 | Zwick _____ 269—73 |
| 3,166,361 | 1/1965 | Panzer _____ 269—55 X |
| 2,567,517 | 9/1951 | Keebler _____ 269—78 X |

ROBERT C. RIORDON, Primary Examiner

L. GILDEN, Assistant Examiner

U.S. Cl. X.R.

16—170, 173